(12) United States Patent
Madhavan

(10) Patent No.: US 8,054,924 B2
(45) Date of Patent: Nov. 8, 2011

(54) DATA TRANSMISSION METHOD WITH PHASE SHIFT ERROR CORRECTION

(75) Inventor: Sethu K. Madhavan, Canton, MI (US)

(73) Assignee: General Motors LLC, Detroit, MI (US)

( * ) Notice: Subject to any disclaimer, the term of this patent is extended or adjusted under 35 U.S.C. 154(b) by 1380 days.

(21) Appl. No.: 11/130,926

(22) Filed: May 17, 2005

(65) Prior Publication Data

US 2006/0262875 A1    Nov. 23, 2006

(51) Int. Cl.
*H04B 1/10* (2006.01)
(52) U.S. Cl. ...... 375/350; 375/328; 375/354; 455/67.16
(58) Field of Classification Search .......... 375/326, 375/382–283, 226, 269, 268, 279–285, 329–33, 375/362, 371, 375, 259–260, 316, 354, 359, 375/364–365, 368, 344, 346, 349–350, 327–337; 455/67.16, 276.1, 130, 296, 303–304
See application file for complete search history.

(56) References Cited

U.S. PATENT DOCUMENTS

| | | | |
|---|---|---|---|
| 3,731,201 A | 5/1973 | Frisbie | |
| 4,499,339 A | 2/1985 | Richard | |
| 4,675,614 A * | 6/1987 | Gehrke | 327/3 |
| 4,928,107 A | 5/1990 | Kuroda | |
| 5,043,736 A | 8/1991 | Darnell et al. | |
| 5,223,844 A | 6/1993 | Mansell et al. | |
| 5,235,633 A | 8/1993 | Dennison et al. | |
| 5,365,450 A | 11/1994 | Schuchman et al. | |
| 5,388,147 A | 2/1995 | Grimes | |
| 5,422,816 A | 6/1995 | Sprague et al. | |
| 5,539,810 A | 7/1996 | Kennedy, III et al. | |
| 5,555,286 A | 9/1996 | Tendler | |
| 5,703,908 A * | 12/1997 | Mammone et al. | 375/278 |
| 5,712,899 A | 1/1998 | Pace, II | |
| 5,754,554 A | 5/1998 | Nakahara | |
| 5,786,789 A | 7/1998 | Janky | |
| 5,812,087 A | 9/1998 | Krasner | |
| 5,946,304 A | 8/1999 | Chapman et al. | |

(Continued)

FOREIGN PATENT DOCUMENTS

EP    0545783 A1    11/1992

(Continued)

OTHER PUBLICATIONS

Letter of Jun. 25, 2007 from Micah D. Stolowitz to Anthony L. Simon (2 pages).

(Continued)

*Primary Examiner* — David C. Payne
*Assistant Examiner* — James M Perez
(74) *Attorney, Agent, or Firm* — Anthony L. Simon; Reising Ethington P.C.

(57) ABSTRACT

A data transmission method with phase shift error correction comprising: transmitting through a network a transmission signal, wherein the transmission signal comprises a reference signal component having a predetermined frequency and a data signal component; receiving the transmission signal, wherein the received transmission signal includes a phase shift error caused by the network, wherein the phase shift error is in both the received reference signal component and the received data signal component; generating a multiplier signal at a receiver having the predetermined reference frequency; using the multiplier signal to determine the phase shift error in the received transmission signal; and correcting the received data signal component using the determined phase shift error.

5 Claims, 2 Drawing Sheets

U.S. PATENT DOCUMENTS

| | | | |
|---|---|---|---|
| 5,978,756 | A | 11/1999 | Walker et al. |
| 5,999,125 | A | 12/1999 | Kurby |
| 6,011,806 | A | 1/2000 | Herring |
| 6,049,303 | A | 4/2000 | Biacs et al. |
| 6,070,089 | A | 5/2000 | Brophy et al. |
| 6,091,969 | A | 7/2000 | Brophy et al. |
| 6,108,317 | A | 8/2000 | Jones et al. |
| 6,140,956 | A | 10/2000 | Hillman et al. |
| 6,144,336 | A | 11/2000 | Preston et al. |
| 6,175,801 | B1 | 1/2001 | Millington et al. |
| 6,226,529 | B1 | 5/2001 | Bruno et al. |
| 6,236,652 | B1 | 5/2001 | Preston et al. |
| 6,345,251 | B1 | 2/2002 | Jansson et al. |
| 6,363,339 | B1 | 3/2002 | Rabipour et al. |
| 6,366,772 | B1 | 4/2002 | Arnson |
| 6,493,338 | B1 | 12/2002 | Preston et al. |
| 6,611,804 | B1 | 8/2003 | Dorbecker et al. |
| 6,614,349 | B1 | 9/2003 | Procter et al. |
| 6,681,121 | B1 | 1/2004 | Preston et al. |
| 6,690,681 | B1 | 2/2004 | Preston et al. |
| 6,748,026 | B1* | 6/2004 | Murakami et al. .......... 375/316 |
| 6,771,629 | B1 | 8/2004 | Preston et al. |
| 6,920,129 | B2 | 7/2005 | Preston et al. |
| 7,151,768 | B2 | 12/2006 | Preston et al. |
| 7,164,662 | B2 | 1/2007 | Preston et al. |
| 7,173,995 | B2* | 2/2007 | Karlquist .......... 375/376 |
| 7,206,305 | B2 | 4/2007 | Preston et al. |
| 2002/0001317 | A1 | 1/2002 | Herring |
| 2002/0097701 | A1 | 7/2002 | Lupien et al. |
| 2002/0111172 | A1 | 8/2002 | SeWolf et al. |
| 2002/0175855 | A1 | 11/2002 | Richton et al. |
| 2002/0177450 | A1 | 11/2002 | Vayanos |
| 2003/0069694 | A1 | 4/2003 | Fuchs |
| 2003/0225574 | A1 | 12/2003 | Matsuura et al. |
| 2004/0008618 | A1* | 1/2004 | Shirakata et al. .......... 370/208 |
| 2004/0198378 | A1 | 10/2004 | Hay |
| 2004/0214599 | A1 | 10/2004 | Ogino |
| 2004/0220803 | A1 | 11/2004 | Chiu et al. |
| 2005/0013283 | A1 | 1/2005 | Yoon et al. |
| 2005/0021332 | A1 | 1/2005 | Ryu et al. |
| 2005/0143916 | A1 | 6/2005 | Kim et al. |
| 2005/0175113 | A1* | 8/2005 | Okuyama .......... 375/260 |
| 2005/0182530 | A1 | 8/2005 | Murphy |
| 2006/0224317 | A1 | 10/2006 | Sarkar |
| 2006/0239363 | A1 | 10/2006 | Blakeney et al. |
| 2006/0280159 | A1 | 12/2006 | Bi et al. |
| 2007/0092024 | A1 | 4/2007 | Madhavan et al. |
| 2007/0109185 | A1 | 5/2007 | Kracke et al. |
| 2007/0129077 | A1 | 6/2007 | Iguchi et al. |
| 2007/0135134 | A1 | 6/2007 | Patrick |
| 2007/0244695 | A1 | 10/2007 | Manjunath et al. |
| 2007/0258398 | A1 | 11/2007 | Chesnutt et al. |
| 2008/0247484 | A1 | 10/2008 | Chesnutt et al. |
| 2008/0255828 | A1 | 10/2008 | Chesnutt et al. |
| 2008/0273644 | A1 | 11/2008 | Chesnutt et al. |

FOREIGN PATENT DOCUMENTS

| | | |
|---|---|---|
| WO | 8912835 | 12/1989 |

OTHER PUBLICATIONS

Lin et al., "Data Compression of Voiceband Modem Signals," 40th IEEE Vehicular Technology Conference (May 6-9, 1990), pp. 323-325.

Mueller et al., "A DSP Implemented Dual 9600/7200 bps TCM Modem for Mobile Communications Over FM Voice Radios," 1997 IEEE, pp. 758-761.

Letter of Jun. 20, 2007 from Vernon W. Francissen to Anthony L. Simon (2 pages).

Letter of May 15, 2007 from Mark E. Hankin to Anthony Simon (4 pages).

Speech Coding with Linear Predictive Coding (LPC); www.dspexperts.com/dsp; retrieved Aug. 14, 2005; author unknown; 15 pages.

Phase-shift Keying; retrieved from Wikipedia; Oct. 23, 2005; 13 pages.

Letter of Jun. 25, 2007, from Micah D. Stolowitz to James D. Stevens (2 pages).

\* cited by examiner

DATA TRANSMISSION METHOD WITH PHASE SHIFT ERROR CORRECTION

TECHNICAL FIELD

This invention relates to a data transmission method.

BACKGROUND OF THE INVENTION

A variety of technologies are available to transmit information wirelessly, particularly digitally encoded data. A telematics unit installed in a mobile vehicle, for example, may transmit digitally encoded vehicle information when establishing communication with a telematics call center or data center. Wireless digital data, ranging from text messages to wireless file transfer, is commonly used. Digital or binary data represents meaningful information, or symbols, encoded as a sequence of logical ones and zeros. In most encoding schemes a logical one represents a "true" or "on" state, and a logical zero represents a "false" or "off" state.

Various methods are employed to transmit digital data wirelessly. These methods include Amplitude Shift Key (ASK) where ones and zeros are represented as different amplitudes at the same frequency. In this method a representation of a one may have higher amplitude than a representation of a zero. Another method is Frequency Shift Keying (FSK), which represents ones and zeros as altered frequencies with no amplitude change. In this method, a one typically has a lower frequency than a zero.

Another efficient and popular method is Phase Shift Keying (PSK) where the data to be transmitted is encoded by varying the phase representing ones and zeros. In some cases a logical one is represented by a 180 degree phase shift and a logical zero is represented by a zero degree phase shift. A variance of PSK is differential PSK, which provides a phase shift relative to the phase of the previously transmitted logical one or zero.

An unintended phase shift error may be introduced as a signal traverses through landline and wireless networks. This unintended phase shift error may cause difficulty in correctly sampling and decoding a transmitted signal.

SUMMARY OF THE INVENTION

Advantageously, this invention provides a data transmission method with phase shift error correction according to claim 1.

Advantageously, according to one example, this invention provides a data transmission method with phase shift error correction comprising: transmitting through a network a transmission signal, wherein the transmission signal comprises a reference signal component having a predetermined frequency and a data signal component; receiving the transmission signal, wherein the received transmission signal includes a phase shift error caused by the network, wherein the phase shift error is both in the received reference signal component and the received data signal component; generating a multiplier signal at a receiver having the predetermined reference frequency; using the multiplier signal to determine the phase shift error in the received transmission signal; and correcting the received data signal component using the determined phase shift error.

DESCRIPTION OF AN EXEMPLARY EMBODIMENT

Figure 1:
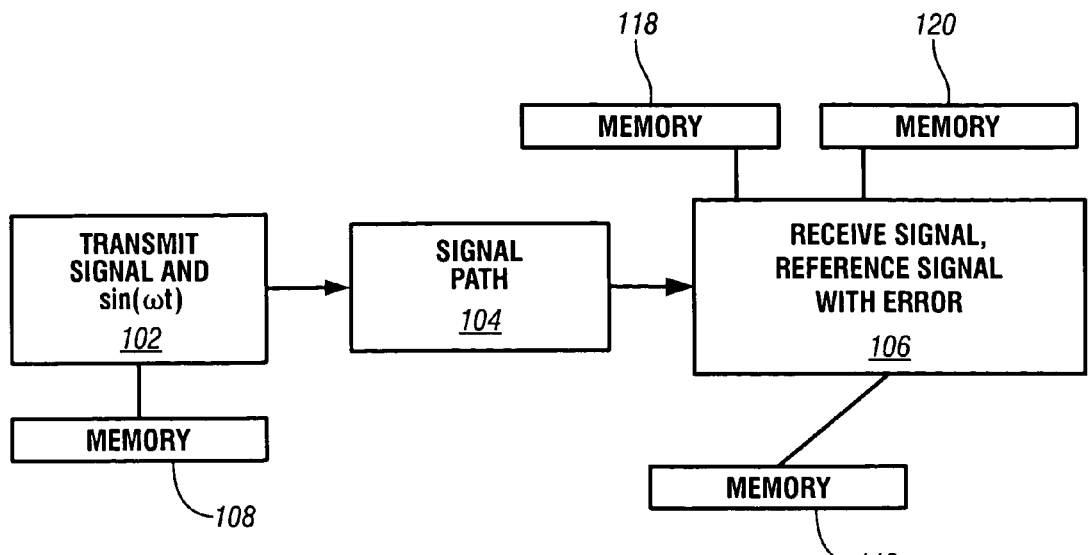
FIG. 1 illustrates an example schematic signal transmission and reception mechanism.
Figure 2:
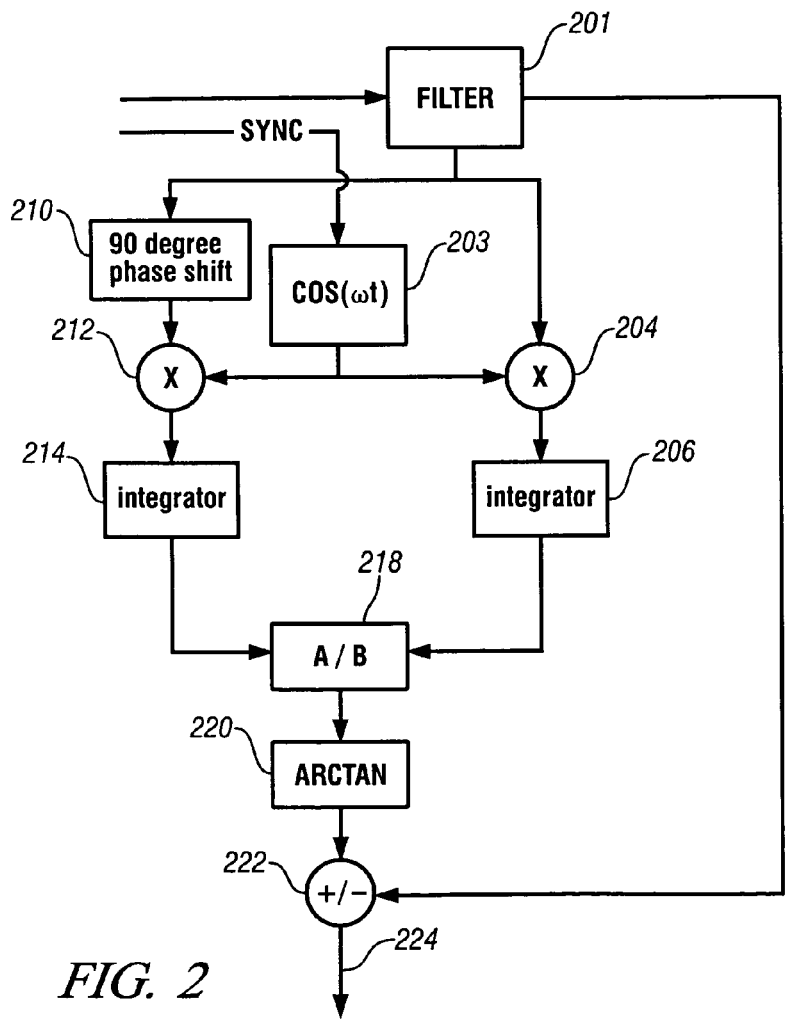
FIG. 2 illustrates example schematic phase error correction.
Figure 3:
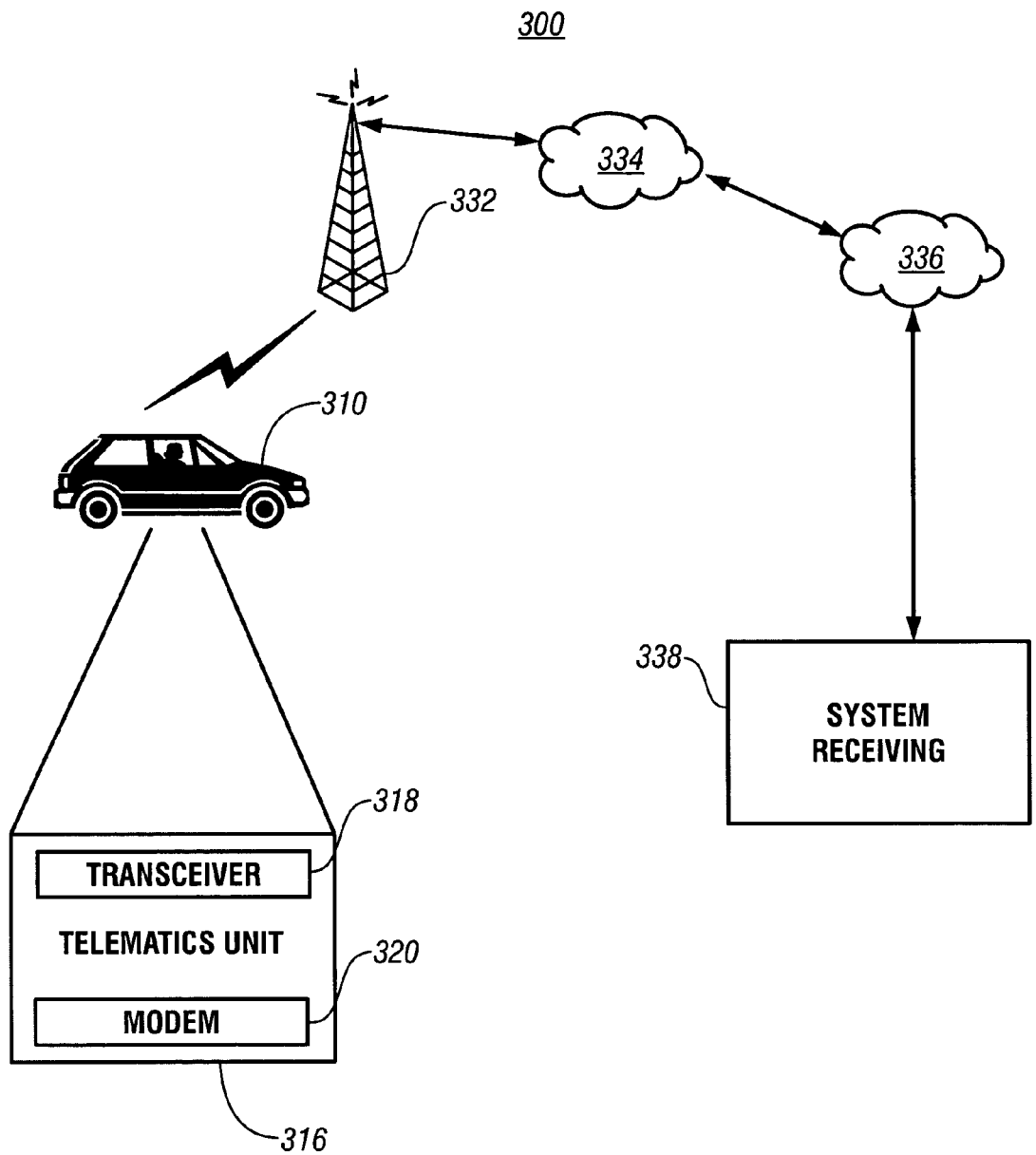
FIG. 3 illustrates an example system for implementing this invention.

Referring to FIGS. 1-3, a source device 102 transmits a signal carrying digital data and a reference signal of a know reference frequency $\sin(\omega t)$, where $\omega$ is the frequency. The reference frequency $\sin(\omega t)$ is also known at the receiving device 106. For example, a binary representation of the reference frequency may reside in a fixed memory located within a wireless modem 320, within a telematics unit 316, and/or a modem within a receiving system 338, such as is used to support a call center or data center.

The receiving device has operatively associated therewith memory (represented by blocks 112, 118 and 120) that can be used in signal processing operations described herein to buffer and temporarily store data representing the received signal being operated on for error correction purposes. Reference 108 represents source device memory.

The signal path 104 traverses through a plurality of communication network entities, such as, for example, one or more wireless carrier systems 332, communications networks 334, and land networks 336. As the signal passes through the network entities, the signal may be adulterated by transmission factors, such as, for example, electrical noise and transmission delay, which may cause a phase shift error in the transmitted signal. The potentially shifted signal is then received and sampled at the receiving device 106. The received transmission contains a data component represented by Signal+$\epsilon$ and the received reference signal component $\sin(\omega t+\epsilon)$, where $\epsilon$ is the phase error due to the offset or shift in the initial sampling phase introduced by one or more of the networks.

A synchronization pattern, well known in the art, may be used to notify the receiving device 106 to accept the incoming signal. For example, a synchronization pattern may be a specific bit pattern such as 11111111 or 0000000 issued by the source device 102. Another example of a synchronization pattern is a specific tone transmitted for a specific duration of time. The receiving device 106 recognizes the synchronization pattern and accepts the incoming signal. The termination of the synchronization pattern triggers the beginning of the signal sample period, $T_0$. The duration of the sample period, time T, is left to the designer, one skilled in the art. In some instances, the termination of the synchronization pattern at the receiving device may not be immediately detected, causing an additional sampling phase error.

In FIG. 2, example operation in the receiving device begins at block 201, which filters the incoming signal to isolate the data and reference frequency components. The data component, represented by Signal+$\epsilon$, is provide to block 222 and the reference signal component, represented by $\sin(\omega t+\epsilon)$, is provided to blocks 210 and 204.

At step 203, a signal $\cos(\omega t)$ is generated in response to a synchronization signal developed from the transmission in a known manner so that $\cos(\omega t)$ is synchronous with $\sin(\omega t)$. The signal $\cos(\omega t)$ is referred to as the reference multiplier.

In step 204, the signal $\sin(\omega t+\epsilon)$ is multiplied by $\cos(\omega t)$. If the incoming signal contained no sample phase error, all sample points of the received reference signal would be ninety degrees out of phase with the reference multiplier, which, when integrated from a sample period of time zero to time T, resolves to zero. But in a transmission through wireless and landline networks, there may likely be introduced phase shift error, in which case the result of step 204 is not zero.

In step 206, the result of step 204 is integrated over a time period T, and the result can be shown to resolve to:

$$\int \cos^2(\omega t) * \sin(\epsilon) \, dt.$$

At step 210, the received reference signal $\sin(\omega t+\epsilon)$ is shifted by ninety degrees, resulting in $\sin((\omega t+\epsilon)+90)$, which is equal to $-\cos(\omega t+\epsilon)$.

At step 212, the incoming signal is operated on by the reference multiplier $\cos(\omega t)$, resulting in $-\cos(\omega t+\epsilon)*\cos(\omega t)$. The method then advances to step 214.

At 214, the result of block 212 is integrated similarly to block 206 and it can be shown that this results in:

$$\int -\cos^2(\omega t) * \cos(\epsilon) \, dt.$$

In step 218, the output of block 206 is divided by the output of block 214, the result of which is $-\tan(\epsilon)$. Step 220 calculates the arctangent of the result of 218, providing a quantification of the phase error induced in the received signal, $\epsilon$.

At step 222, the phase error $\epsilon$ is summed with the isolated data component of the received signal, Signal+$\epsilon$ so that the result of block 222 is Signal+$\epsilon$−$\epsilon$ or Signal. Thus, the phase shift error introduced into the data component during the transmission process is eliminated, and the corrected data is available for further processing.

Thus, for vehicle 310, in which is located a telematics unit 316 with a wireless transceiver 318 and a hardware or software modem 320, data is transmitted over one or more wireless carrier systems 332, one or more communication networks 334, and one or more land networks 336, to be received at one or more receiving system 338. Wireless carrier system 332 is implemented as a cellular communications network or any other suitable system for transmitting signals between vehicle 310 and communications network 334. In one embodiment, vehicle 310 is implemented as a mobile vehicle with suitable hardware and software for transmitting and receiving voice and data communications. The vehicle 310 may include additional components not relevant to the present discussion but well known in the telematics arts. Mobile vehicle communication systems are known in the art.

For example, vehicle 310, through its vehicle data bus, sends signals from the telematics unit 316 to various units of equipment and systems within the vehicle 310 to perform various functions such as unlocking a door and executing personal comfort settings. Telematics unit 316, via the vehicle data bus, receives signals from various units of equipment and systems within the vehicle to perform various functions such as, for example, determining the position and course of the vehicle 310. For example, turn rate sensor information on the vehicle data bus is used with positional information provided by a GPS receiver associated with the telematics unit 316 to determine an accurate vehicle position with respect to a digital map contained in the telematics unit 316 memory. In another embodiment, equipment and systems input and output may be directly connected via discrete wiring to the telematics unit 316.

Telematics unit 316 includes a processor coupled to the various components described herein, including, but not limited a microphone, one or more speakers.

Telematics unit 316 may include additional or fewer components and functionality as determined by the system designer and known in the art for use in telematics units.

Coupling a vehicle telematics unit 316 to various vehicle systems and components through a vehicle data bus or separate discrete connections is well known to those skilled in the art.

The receiving station 338 contains one or more switches, communications services managers and other processing equipment to support computer and human operator interaction with the telematics unit 316. In one example, the receiving station supports both voice and data communication with the vehicle telematics unit 316 and various structures for supporting the voice and data communications are well known to those skilled in the art. The receiving station may include both data and voice call handling capability, or the voice and data control may be separately located. For example, the computer telephony applications may reside at one geographic location while people serving as advisors for conversing with occupants of vehicle 310 may be located at one or more other geographic locations.

Since telematics implementations typically include bi-directional data communication, both the telematics unit 316 and the receiving system 338 have capabilities to transmit and receive the data and to apply the error correction set forth herein.

The invention claimed is:

1. A data transmission method with phase shift error correction comprising:
transmitting through a network a transmission signal, wherein the transmission signal comprises a reference signal component having a predetermined frequency and a data signal component;
receiving the transmission signal, wherein the received transmission signal includes a phase shift error caused by the network, wherein the phase shift error is in both the received reference signal component and the received data signal component;
generating a multiplier signal at a receiver having the predetermined reference frequency;
using the multiplier signal to determine the phase shift error in the reference signal component of the received transmission signal; and
subtracting the determined phase shift error from the data signal component having the phase shift error.

2. The method of claim 1 further comprising:
isolating the received reference signal component from the received data signal component; and
applying the multiplier signal to the received reference signal component.

3. The method of claim 2 further comprising:
providing a ninety-degree phase shift of the received reference signal component;
first multiplying the multiplier signal by the received reference signal component to determine a first multiplying result; and
second multiplying the multiplier signal to the ninety-degree phase shifted reference signal component to determine a second multiplying result.

4. The method of claim 3 further comprising:
first integrating the first multiplying result; and
second integrating the second multiplying result.

5. The method of claim 4 wherein the step of correcting comprises:
determining a ratio of the first and second integrations, wherein the determined phase shift error is responsive to the ratio.

* * * * *